United States Patent
Ueda et al.

(10) Patent No.: US 12,272,124 B2
(45) Date of Patent: Apr. 8, 2025

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventors: Kenki Ueda, Toyota (JP); Ryosuke Tachibana, Toyota (JP); Shinichiro Kawabata, Toyota (JP); Takashi Kitagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 294 days.

(21) Appl. No.: 18/062,649

(22) Filed: Dec. 7, 2022

(65) Prior Publication Data

US 2023/0230362 A1 Jul. 20, 2023

(30) Foreign Application Priority Data

Jan. 18, 2022 (JP) .................. 2022-005489

(51) Int. Cl.
*G06V 20/56* (2022.01)
*G06V 10/774* (2022.01)
*G06V 10/94* (2022.01)

(52) U.S. Cl.
CPC .......... *G06V 10/7747* (2022.01); *G06V 10/95* (2022.01); *G06V 20/56* (2022.01)

(58) Field of Classification Search
CPC .... G06V 20/56; G06V 20/58; G06V 10/7747; G06V 10/95; G06V 10/764; G06V 10/774
See application file for complete search history.

(56) References Cited

U.S. PATENT DOCUMENTS

| | | | |
|---|---|---|---|
| 2019/0375420 A1* | 12/2019 | Hou | G06N 3/044 |
| 2021/0012127 A1* | 1/2021 | Chen | G06V 40/171 |
| 2021/0097302 A1* | 4/2021 | Butcher | G06F 18/24 |
| 2021/0354704 A1* | 11/2021 | Simoncini | G07C 5/008 |
| 2023/0398994 A1* | 12/2023 | Yamasaki | B60W 40/09 |

FOREIGN PATENT DOCUMENTS

| | | | | |
|---|---|---|---|---|
| CN | 109583410 A | * | 4/2019 | ........ G06K 9/00845 |
| CN | 109987102 A | * | 7/2019 | |
| CN | 112885036 A | * | 6/2021 | |
| JP | 2007141212 A | | 6/2007 | |
| JP | 2019032725 A | | 2/2019 | |
| JP | 2021170260 A | | 10/2021 | |
| JP | 2022054295 A | | 4/2022 | |

\* cited by examiner

*Primary Examiner* — Carol W Chan
(74) *Attorney, Agent, or Firm* — Dickinson Wright, PLLC

(57) ABSTRACT

In an information processing device (a server device), a first acquirer acquires multiple captured images of the outside of a vehicle. A detector detects, from acquired multiple captured images, multiple images related to unsafe driving using a learned model. An image extractor extracts, from detected multiple images related to unsafe driving, an image to be a candidate for relearning data of the learned model.

4 Claims, 3 Drawing Sheets

INFORMATION PROCESSING DEVICE AND INFORMATION PROCESSING METHOD

The disclosure of Japanese Patent Application No. 2022-5489 filed on Jan. 18, 2022 including the specification, drawings and abstract is incorporated herein by reference in its entirety.

BACKGROUND

1. Technical Field

The present disclosure relates to an information processing device and an information processing method for detecting an image related to unsafe driving.

2. Description of Related Art

JP-A-2007-141212 discloses a driving assisting device for facilitating the check of analysis results and thereby contributing to safe driving of a driver. This device extracts, from the center's storage unit, violation data corresponding to a mesh area around each of the top 50 mesh areas where violation data frequently occur and judges the top 20 candidate areas, where the number of occurrence of corresponding violation data is higher, to be violation frequent areas, which are displayed and developed on the analysis screen.

In a technology using an image recognition model to detect an image related to unsafe driving from a captured image of the outside of a vehicle, it is desirable to conduct relearning of the model in order to improve the detection accuracy. However, preparing data for relearning requires a great deal of effort.

SUMMARY

A general purpose of the present disclosure is to provide a technology for reducing effort required to prepare relearning data.

In response to the above issue, an information processing device of one aspect of the present disclosure includes: an acquirer configured to acquire multiple captured images of the outside of a vehicle; a detector configured to detect, from an acquired multiple captured images, multiple images related to unsafe driving using a learned model; and an image extractor configured to extract, from a detected multiple images related to unsafe driving, an image to be a candidate for relearning data of the learned model.

Another aspect of the present disclosure relates to an information processing method. The method is an information processing method implemented by a computer and includes: acquiring multiple captured images of the outside of a vehicle; detecting, from an acquired multiple captured images, multiple images related to unsafe driving using a learned model; and extracting, from a detected multiple images related to unsafe driving, an image to be a candidate for relearning data of the learned model.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

Various embodiments now will be described. The embodiments are illustrative and are not intended to be limiting.

Figure 1:
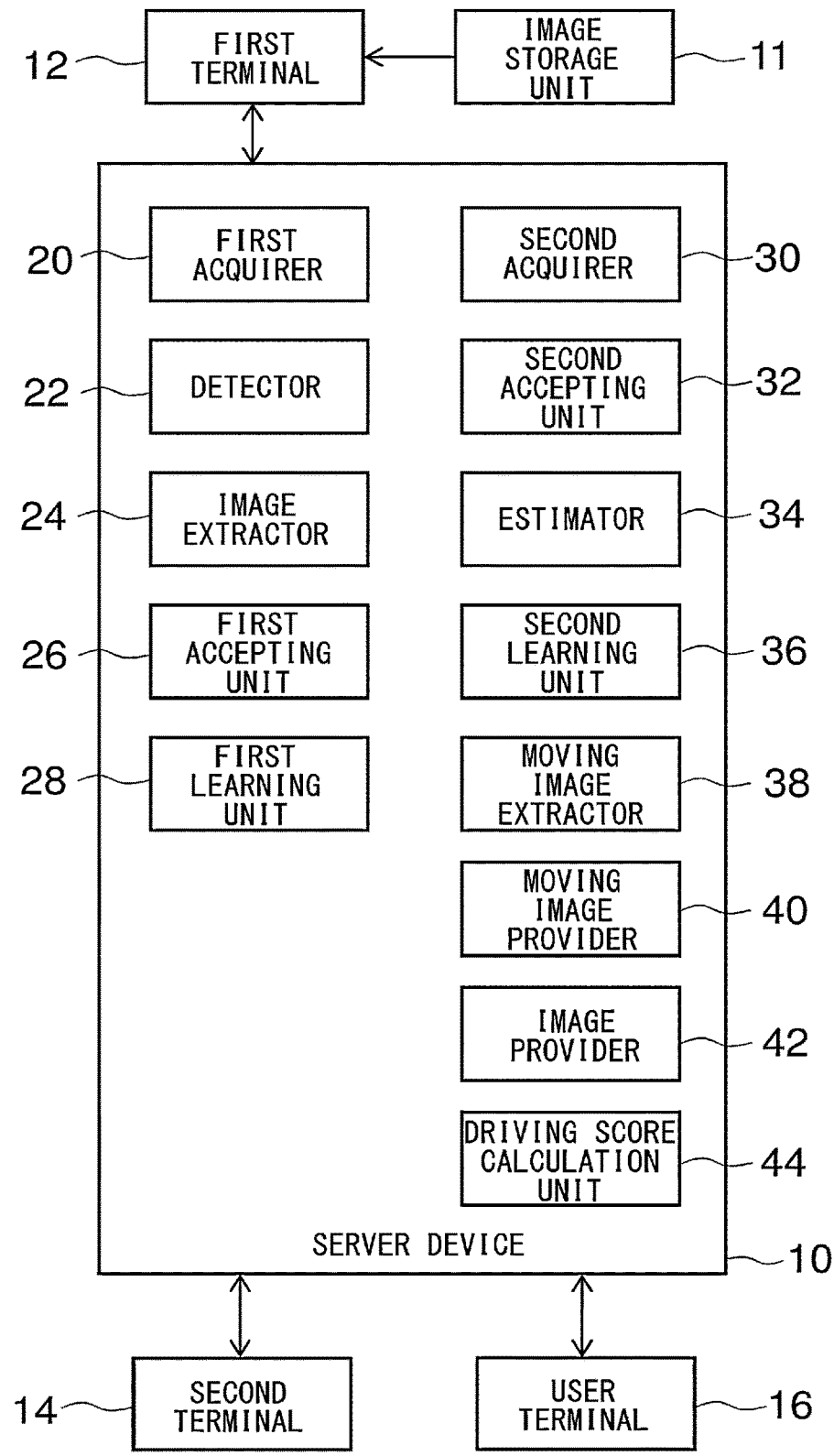
FIG. 1 shows a configuration of a driving evaluation system according to an embodiment.

FIG. 1 shows a configuration of a driving evaluation system 1 according to an embodiment. The driving evaluation system 1 analyzes captured images stored in a dashboard camera on a vehicle to detect an image related to unsafe driving on the vehicle. The image related to unsafe driving may also be referred to as an image of a dangerous scene.

The driving evaluation system 1 includes a server device 10, a first terminal 12, a second terminal 14, and a user terminal 16. Each of the first terminal 12, the second terminal 14, and the user terminal 16 is connected to a network, not illustrated, via wired or wireless communication and communicates with the server device 10 via the network.

The server device 10 may be installed in a data center or the like and functions as an information processing device. The first terminal 12 may be used by an operator at an automobile dealer, for example. The second terminal 14 is used by an operator who checks a detected image related to unsafe driving. The user terminal 16 may be owned by a vehicle's driver or a family member of the driver, for example. The driving evaluation system 1 may include multiple first terminals 12, multiple second terminals 14, and multiple user terminals 16.

For example, when a vehicle is brought to an automobile dealer, an operator retrieves a series of captured images from the vehicle's dashboard camera and inputs the captured images to the server device 10 via the first terminal 12 at the automobile dealer. The server device 10 analyzes the input series of captured images to detect an image captured when unsafe driving was performed on the vehicle and calculates a driving score based on the detection result. The detection of an image related to unsafe driving is performed using a first learned model obtained through machine learning based on learning data. A detected image related to unsafe driving is provided to a family member of the driver, for example, by the user terminal 16, so that the family member can easily find what kind of unsafe driving the driver has performed. The calculated driving score is provided to the vehicle's driver via the first terminal 12 or the user terminal 16 and also provided to a family member of the driver, for example, via the user terminal 16, so that the driver and the family member can also find the driver's driving ability.

The server device 10 extracts, from detected multiple images relate to unsafe driving, an image to be a candidate (hereinafter, also referred to as a candidate image) for relearning data of the first learned model and provides the image to the second terminal 14. The second terminal 14 then displays the candidate image thus extracted. The operator visually checks whether or not the displayed image is an image related to unsafe driving and inputs the check result to the second terminal 14. The check of the images and input of the check results performed by the operator is called annotation, and the operator is called an annotator. By extracting an image to be a candidate for relearning data from the detected multiple images related to unsafe driving, the time required for the annotator to check images for annotation for relearning can be reduced. Therefore, the effort required to prepare the relearning data can be reduced.

The server device 10 uses an image after annotation as relearning data to conduct relearning of the first learned model. This can improve the accuracy of detecting an image related to unsafe driving.

An image storage unit 11 stores captured images of the surroundings of a vehicle captured by a vehicle-mounted camera. The captured images stored in the image storage unit 11 are arranged in chronological order and constitute moving images. The first terminal 12 acquires a moving image stored in the dashboard camera from the image storage unit 11 and transmits the moving image thus acquired to the server device 10. The image storage unit 11 is hardware such as a flash memory and may be manually removed by an operator from the vehicle and connected to the first terminal 12. The image storage unit 11 may also be connected to the server device 10 via a network such as the Internet using a communication device on the vehicle.

The second terminal 14 is a personal computer or the like used by the annotator, and the second terminal 14 displays a candidate image for relearning data and accepts input of an image check result from the annotator.

The user terminal 16 may be a smartphone, a tablet, or a personal computer owned by the driver or a family member of the driver, for example. The user terminal 16 outputs information regarding unsafe driving provided by the server device 10.

The server device 10 includes a first acquirer 20, a detector 22, an image extractor 24, a first accepting unit 26, a first learning unit 28, a second acquirer 30, a second accepting unit 32, an estimator 34, a second learning unit 36, a moving image extractor 38, a moving image provider 40, an image provider 42, and a driving score calculation unit 44.

The configuration of the server device 10 may be implemented by a CPU or memory of any given computer, an LSI, or the like in terms of hardware, and by a memory-loaded program or the like in terms of software. In the present embodiment is shown a functional block configuration realized by cooperation thereof. Therefore, it will be understood by those skilled in the art that these functional blocks may be implemented in a variety of forms by hardware only, software only, or a combination thereof.

The first acquirer 20 acquires, from the image storage unit 11, multiple captured images of the outside of a vehicle captured by a vehicle-mounted camera.

The detector 22 detects, from the multiple captured images acquired by the first acquirer 20, an image related to unsafe driving using the first learned model. The image related to unsafe driving may be, for example, an image capturing a failure to stop at a position where vehicles are required to stop, an image capturing ignoring a traffic light, an image capturing driving over the lane, an image capturing a dangerous left or right turn, an image capturing obstructing a pedestrian, an image capturing exceeding a speed limit, or an image capturing a failure to slow down when a bicycle suddenly rushed out. The detector 22 may detect one image from a series of multiple captured images showing an unsafe driving behavior.

The detector 22 performs object detection processing on all acquired captured images using the first learned model. The first learned model may include a publicly-known object detection model. The multiple captured images, constituting a moving image of 30 frames per second, for example, are arranged in chronological order. The detector 22 derives the position coordinates of a detected object on a captured image and the type and confidence of the object. The position coordinates of an object may be the position coordinates of the four corners of a rectangle that surrounds the object. The confidence is also called the confidence value or reliability and indicates the certainty of the detected object. The detector 22 detects an image related to unsafe driving based on the type and position of a detected object.

The detector 22 detects a marking indicating a stop position from a captured image to identify the stop position. The marking indicating a stop position is a specific traffic marking, such as a stop line and a stop sign.

The detector 22 detects a certain object, such as a vending machine, within a captured image as a feature point and tracks the feature point included in captured images arranged in chronological order to calculate the vehicle's speed.

Based on the identified stop position and the calculated vehicle speed, the detector 22 detects the vehicle has not stopped at the stop position. When the vehicle's not stopping was detected, the detector 22 detects an image that shows a marking indicating the stop position, as an image related to unsafe driving. To the image related to unsafe driving thus detected, the detector 22 attaches a label of "Stop sign violation" as the type of unsafe driving and also attaches a confidence regarding the marking indicating the stop position.

The detector 22 also detects a red light from a captured image and identifies a stop position; based on the identified stop position and the calculated vehicle speed, the detector 22 detects the vehicle has not stopped before the stop position. When the vehicle's not stopping was detected, the detector 22 detects an image that shows the red light as an image related to unsafe driving. To the image related to unsafe driving thus detected, the detector 22 attaches a label of "Ignoring a traffic light" as the type of unsafe driving and also attaches a confidence regarding the red light.

The detector 22 also detects a crosswalk and a pedestrian from a captured image and identifies a stop position; based on the identified stop position and the calculated vehicle speed, the detector 22 detects the vehicle has not stopped at the stop position. When the vehicle's not stopping was detected, the detector 22 detects an image that shows the crosswalk and the pedestrian as an image related to unsafe driving. To the image related to unsafe driving thus detected, the detector 22 attaches a label of "Obstructing a pedestrian" as the type of unsafe driving and also attaches a confidence regarding the crosswalk and the pedestrian.

The detector 22 also detects a speed limit from a traffic sign within a captured image; based on the detected speed limit and the calculated vehicle speed, the detector 22 detects the vehicle has exceeded the speed limit. When the vehicle's exceeding the speed limit was detected, the detector 22 detects an image that shows the traffic sign indicating the speed limit, as an image related to unsafe driving. To the image related to unsafe driving thus detected, the detector 22 attaches a label of "Exceeding a speed limit" as the type of unsafe driving and also attaches a confidence regarding the traffic sign.

The image extractor 24 extracts, from multiple images related to unsafe driving detected by the detector 22, an image to be a candidate for relearning data of the first learned model. When the confidence of a detected image related to unsafe driving is less than a threshold, or when the confidence of the image is equal to or greater than the threshold and the image satisfies a predetermined condition under which false detection is likely to occur, the image extractor 24 extracts the image. When the confidence of a detected image related to unsafe driving is equal to or greater than the threshold and the image does not satisfy the predetermined condition, the image extractor 24 does not extract the image. The threshold may be appropriately determined through experiments and simulations.

The predetermined conditions may be that the image was captured at night, that the image was captured in rainy weather, and that the image includes reflection on the windshield. Based on the brightness of the image, the image extractor 24 judges whether the image was captured at night. The image extractor 24 also detects whether or not there are raindrops on the windshield in the image and, when the image shows raindrops, the image extractor 24 judges that the image was captured in rainy weather. Raindrops may be detected using an object detection model, for example. The image extractor 24 also derives the degree of reflection on the windshield in the image based on the brightness of the image; when the degree of reflection thus derived is a predetermined value or greater, the image extractor 24 judges that the image includes reflection on the windshield.

The image extractor 24 provides, to the second terminal 14, multiple captured images including the extracted candidate image arranged in chronological order as moving image data. The moving image data include multiple captured images from images captured before to images captured after the candidate image was captured, such as captured images captured from a few seconds before to a few seconds after the candidate image was captured. The image extractor 24 provides moving image data for each extracted candidate image to the second terminal 14. The second terminal 14 displays multiple candidate images provided by the image extractor 24, with text indicating the type of unsafe driving. The second terminal 14 can play a moving image including a candidate image in response to the annotator's operation. The annotator views the candidate images and moving images to check whether or not each displayed candidate image is an image related to unsafe driving and then inputs the check results to the second terminal 14. If the annotator can judge whether or not a candidate image is an image related to unsafe driving only from the candidate image, the moving image need not be played. Also, the image extractor 24 may provide an extracted candidate image to the second terminal 14 without providing moving image data.

For example, if no stop line or stop sign is present in an image related to unsafe driving of which the type is the "stop sign violation," some object within the image may have been falsely detected as a marking indicating a stop position. Accordingly, the annotator judges that this image is not an image related to unsafe driving.

For a candidate image that the annotator has identified as an image related to unsafe driving, the annotator inputs the check result indicating that the candidate image is an image related to unsafe driving. On the other hand, for a candidate image that the annotator has identified not as an image related to unsafe driving, the annotator inputs the check result indicating that the candidate image is not an image related to unsafe driving.

Among multiple captured images from images captured before to images captured after a candidate image was captured, in which the candidate image has been identified as an image related to unsafe driving, the annotator may identify an image showing a dangerous situation and may input a check result indicating that the identified image is an image for learning of a model used to extract a thumbnail image, which will be described later. The dangerous situation may be, for example, a situation where another vehicle approaches from a side within an intersection in the case of stop sign violation or ignoring a traffic light, or a situation where the vehicle is about to come into contact with a pedestrian in front of the vehicle in the case of obstructing a pedestrian. Such situations are likely to be of interest to the driver's family, for example. The image identified by the annotator may be different from the detected image related to unsafe driving. This is because the detected image related to unsafe driving may not necessarily best indicate the dangerous situation.

The second terminal 14 attaches the input check result to information for identifying the candidate image or the image showing a dangerous situation and transmits it to the server device 10.

The first accepting unit 26 of the server device 10 accepts the image identification information transmitted by the second terminal 14. The first accepting unit 26 then provides the identification information of the candidate image to the first learning unit 28 and provides the identification information of the image showing a dangerous situation to the second learning unit 36. The processing at the second learning unit 36 will be described later.

The first learning unit 28 conducts relearning of the first learned model using, as relearning data, a candidate image that has been extracted because the confidence thereof was less than the threshold. Based on the identification information of the candidate image provided by the first accepting unit 26 and the check result attached thereto, the first learning unit 28 conducts relearning using a label corresponding to the check result.

With regard to a candidate image for which has been input the check result indicating that the candidate image is an image related to unsafe driving, the first learning unit 28 conducts relearning using, as the label, an object type already given. The relearning can further improve the confidence of an image that has been correctly judged to be an image related to unsafe driving.

Meanwhile, with regard to a candidate image for which has been input the check result indicating that the candidate image is not an image related to unsafe driving, the first learning unit 28 conducts relearning using, as the label, an object type set as "unknown" or the like. With the relearning, an image captured when unsafe driving is not performed is made less likely to be falsely judged to be an image related to unsafe driving.

The first learning unit 28 conducts relearning of the first learned model using, as relearning data, a candidate image that has been identified not as an image related to unsafe driving, among candidate images that each have been extracted because the confidence thereof was equal to or greater than the threshold and the predetermined condition was satisfied. Accordingly, an image captured when unsafe driving is not performed is made less likely to be falsely judged to be an image related to unsafe driving, even in a situation where false detection is likely to occur.

The relearning may be performed regularly at a predetermined frequency or may be performed when a predetermined number of images as relearning data have been collected. By continuously performing the relearning of the model, the accuracy of detecting an image related to unsafe driving can be improved.

The first learning unit 28 does not use, as relearning data, a candidate image that has been identified as an image related to unsafe driving, among candidate images that each have been extracted because the confidence thereof was equal to or greater than the threshold and the predetermined condition was satisfied. This is because, even though relearning is conducted using such a correctly detected image, since the confidence is equal to or greater than the threshold, it is less likely to further improve the confidence. By not using such an image for relearning, the efficiency of relearning can be improved.

With regard to a candidate image that the annotator has identified as an image related to unsafe driving, if the type of unsafe driving is incorrect, the annotator may also input the correct type of the unsafe driving as the check result. In this case, with regard to the candidate image for which has been input the check result indicating the correct type of the unsafe driving, the first learning unit 28 conducts relearning using, as the label, an object type corresponding to the correct type of the unsafe driving. With the relearning, an image related to unsafe driving of which the type of the unsafe driving has been incorrectly judged is made more likely to be judged to be of the correct type.

Figure 2:
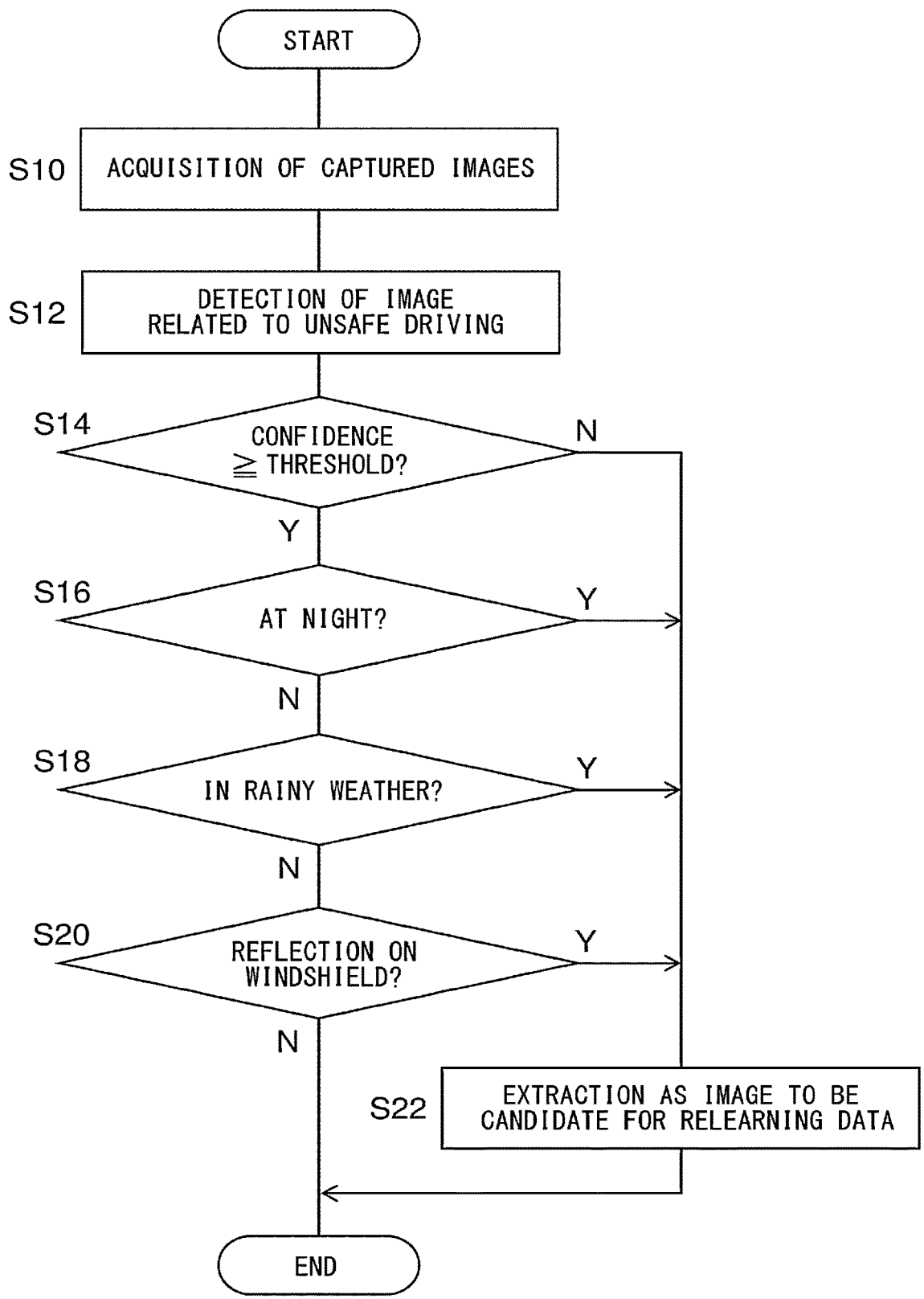
FIG. 2 is a flowchart of processing for extracting a candidate image for relearning data.

FIG. 2 is a flowchart of processing for extracting a candidate image for relearning data. The first acquirer 20 acquires, from the image storage unit 11, a series of captured images captured by a vehicle-mounted camera (S10). The detector 22 detects an image related to unsafe driving from the acquired series of captured images (S12).

When the confidence of the detected image is not equal to or greater than a threshold (N at S14), the image extractor 24 extracts the detected image as an image to be a candidate for relearning data (S22) and terminates the process. When the confidence of the detected image is equal to or greater than the threshold (Y at S14) and when the detected image is an image captured at night (Y at S16), the process shifts to S22. When the detected image is not an image captured at night (N at S16) and when the detected image is an image captured in rainy weather (Y at S18), the process shifts to S22. When the detected image is not an image captured in rainy weather (N at S18) and when the detected image includes reflection on the windshield (Y at S20), the process shifts to S22. When the detected image does not include reflection on the windshield (N at S20), the process is terminated.

There will now be described processing for providing, to the user terminal 16, a moving image including an image related to unsafe driving. The first acquirer 20 provides acquired multiple captured images arranged in chronological order also to the moving image extractor 38. The moving image extractor 38 extracts, from the multiple captured images in chronological order acquired by the first acquirer 20, multiple captured images from images captured before to images captured after an image related to unsafe driving detected by the detector 22 was captured, included in a time interval that depends on the type of the unsafe driving. The time interval is a period from first time before to second time after the captured time of the image related to unsafe driving. The extracted multiple captured images constitute a moving image.

When the type of unsafe driving is the "stop sign violation," the first time is shorter than the second time. For example, the first time may be 5 seconds, and the second time may be 10 seconds. The image related to the unsafe driving is an image captured near a position where vehicles are required to stop, and the image facilitates understanding of the situation after the vehicle has passed through the position. For example, after passing through a position where vehicles are required to stop, a driver may proceed without stopping even when another vehicle has appeared from a side, and such driving of the driver can be grasped. When the type of unsafe driving is the "ignoring a traffic light," the first time is longer than the second time. For example, the first time may be 10 seconds, and the second time may be 5 seconds. This facilitates understanding of the driving and judgment of the driver before the traffic light.

When the type of unsafe driving is the "obstructing a pedestrian," the first time is longer than the second time. For example, the first time may be 10 seconds, and the second time may be 5 seconds. This facilitates understanding of the driving and judgment of the driver before approaching the pedestrian.

The specific values of the first time and the second time may be appropriately determined through experiments and simulations. In the case of heavy weather such as rainy weather, the moving image extractor 38 may make the time interval longer by multiplying the time interval for a case other than heavy weather by a factor greater than 1.

When the type of unsafe driving is the "exceeding a speed limit," the time interval is set, regardless of the weather, to the period of time during which the speed limit is exceeded.

The moving image constituted by the extracted multiple captured images can be played on the user terminal 16, as will be described later, and checked by the driver's family, for example. Since an appropriate playing section can be extracted for each type of unsafe driving, the family, for example, can easily grasp the driving behavior that needs to be improved.

The first acquirer 20 provides acquired multiple captured images arranged in chronological order also to the estimator 34. The estimator 34 estimates an image of high interest to the user, from multiple captured images in chronological order including an image related to unsafe driving detected by the detector 22, using the second learned model. The estimator 34 estimates one image of high interest to the user with respect to one image related to unsafe driving. The estimated image is made associated with the image related to unsafe driving. The learning of the second learned model has been conducted using an image showing a dangerous situation, such as a situation where another vehicle approaches from a side within an intersection.

Figure 3:
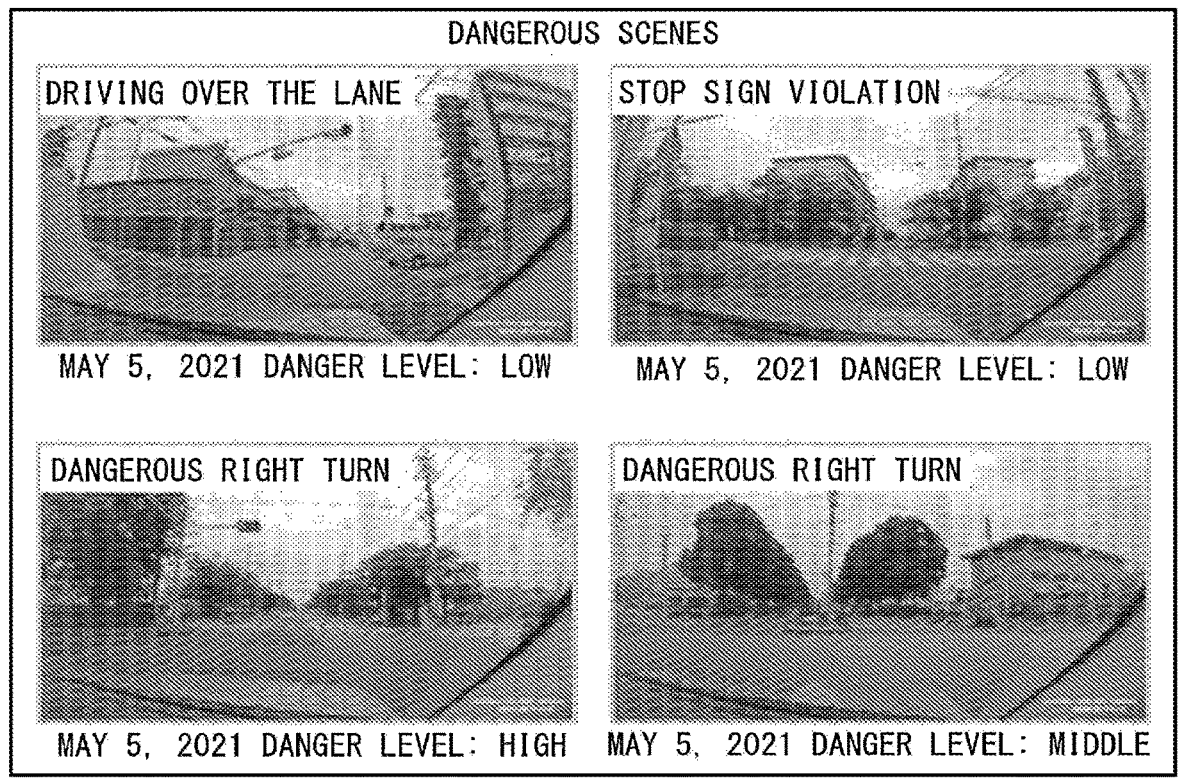
FIG. 3 shows an example of multiple images displayed on a user terminal shown in FIG. 1.

The image provider 42 provides an image estimated by the estimator 34 to the user terminal 16. The user terminal 16 displays the image thus provided as a thumbnail image. On the user terminal 16, multiple images can be displayed as a list. The driver's family, for example, can view a thumbnail image that is of interest to them. FIG. 3 shows an example of multiple images displayed on the user terminal 16 shown in FIG. 1. The user terminal 16 displays each image on which text indicating the type of unsafe driving is superimposed. When the user performs an operation for selecting an image on the user terminal 16, the user terminal 16 transmits the identification information of the selected image to the server device 10.

The second accepting unit 32 of the server device 10 accepts the image identification information transmitted by the user terminal 16 and provides the image identification information to the moving image provider 40.

The moving image provider 40 provides, to the user terminal 16, multiple captured images extracted by the moving image extractor 38, including an image corresponding to the image identification information transmitted by the user terminal 16, as moving image data. The user terminal 16 plays the moving image thus provided. By performing an operation for selecting a thumbnail image, the driver's family, for example, can view an image related to unsafe driving and moving images before and after the image.

During the playing of a moving image, when the user performs an operation for temporarily stopping the playing on the user terminal 16, the user terminal 16 temporarily stops the playing and transmits, to the server device 10, the identification information of the image at the time of the temporary stop.

The second acquirer 30 acquires the identification information of the image at the time of the temporary stop of the playing transmitted by the user terminal 16 and provides the identification information to the second learning unit 36.

The second learning unit 36 conducts relearning of the second learned model using, as relearning data, an image identified by the identification information provided by the second acquirer 30 and an image showing a dangerous situation identified by the identification information provided by the first accepting unit 26. The second learning unit 36 may use, as the relearning data, only an image of which playing has been temporarily stopped a predetermined number of times or more. The relearning may be performed regularly at a predetermined frequency or may be performed when a predetermined number of images as relearning data have been collected. This enables relearning of the second learned model such as to enable estimation of an image similar to an image of which the playing has been stopped by an unspecified user interested in the image or an image similar to an image showing a dangerous situation that the annotator has identified.

Figure 4:
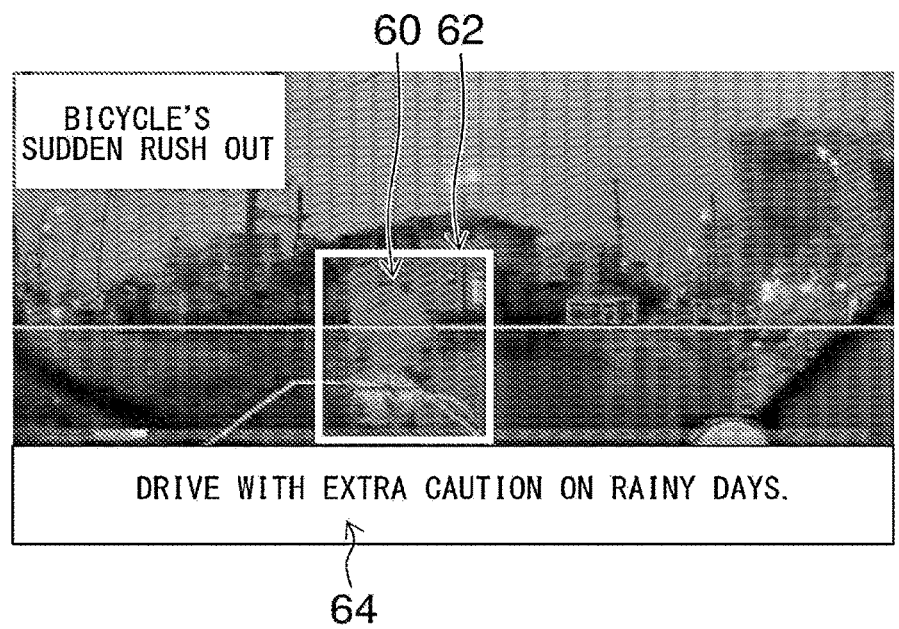
FIG. 4 shows another example of an image displayed on the user terminal shown in FIG. 1.

FIG. 4 shows another example of an image displayed on the user terminal 16 shown in FIG. 1. This image is also a thumbnail image provided by the server device 10, and the type of unsafe driving is "bicycle's sudden rush out." The image provider 42 performs a highlighting process for brightening a bicycle defined as a dangerous object 60 within the image. The image provider 42 also superimposes, on the image, a highlight image 62 for making the dangerous object 60 distinctive. The highlight image 62 is a distinctively colored frame surrounding the bicycle. The image provider 42 may attach, to the image, a driving advice comment 64 set in advance for each type of unsafe driving. The image provider 42 may also change the content of the driving advice depending on the weather.

The driving score calculation unit 44 calculates a driving score that represents the driver's driving skill, based on the detection results from the detector 22. The calculated driving score becomes high when appropriate driving was performed and becomes low when the driving was inappropriate, based on the number of times an image related to unsafe driving was detected, for example.

The driving score calculated by the driving score calculation unit 44 is transmitted to the user terminal 16. The user terminal 16 provides the received driving score to the driver or a family member of the driver, with voice or an image. The driving score may be transmitted to the first terminal 12. The first terminal 12 also provides the received driving score to the driver, with voice or an image. In this way, since the driving evaluation system 1 is capable of diagnosing the driver's skill only from the captured images, the diagnosis can be easily conducted at an automobile dealer or the like. Therefore, when an elderly person brings a vehicle to an automobile dealer, for example, his or her driving skill can be diagnosed, and advice can be given accordingly.

Described above is an explanation based on exemplary embodiments. The embodiments are intended to be illustrative only, and it will be obvious to those skilled in the art that various modifications to a combination of constituting elements or processes could be developed and that such modifications also fall within the scope of the present disclosure.

For example, in the embodiment, an image related to unsafe driving is detected only from the captured images; however, the detector 22 may detect an image related to unsafe driving also using detected values from various vehicle-mounted sensors. For example, based on the vehicle speed detected by a vehicle speed sensor, the detector 22 may detect an image capturing a failure to stop at a position where vehicles are required to stop, or an image capturing ignoring a traffic light. Also, based on the position information of a vehicle and map information, the detector 22 may acquire a speed limit.

What is claimed is:

1. An information processing device, comprising a processor configured to execute program instructions to:
   acquire a plurality of captured images of an outside of a vehicle;
   detect, from the acquired plurality of captured images, a plurality of images related to unsafe driving using a learned model;
   extract, from the detected plurality of images related to unsafe driving, an image to be a candidate for relearning data of the learned model; and
   conduct relearning of the learned model using, as relearning data, an image that has been identified not as an image related to unsafe driving, among images that each have been extracted because a confidence thereof was equal to or greater than a threshold and a predetermined condition was satisfied;
   wherein, when a confidence of a detected image related to unsafe driving is less than the threshold, or when the confidence of the detected image related to unsafe driving is equal to or greater than the threshold and the detected image related to unsafe driving satisfies the predetermined condition under which false detection is likely to occur, extract the detected image related to unsafe driving.

2. The information processing device according to claim 1, wherein, the processor executes program instructions to detect an image related to unsafe driving, from a plurality of captured images in chronological order acquired from a vehicle by the acquirer, the information processing device further program instructions to:
   extract, from the acquired plurality of captured images in chronological order, a plurality of captured images from images captured before to images captured after a detected image related to unsafe driving was captured, included in a time interval that depends on a type of unsafe driving; and
   provide, to a user terminal, an extracted plurality of captured images as moving image data.

3. The information processing device according to claim 1, wherein, the processor executes program instructions to detect an image related to unsafe driving, from a plurality of captured images in chronological order acquired from a vehicle by the acquirer, and
   estimate an image of high interest to a user, from the plurality of captured images in chronological order including a detected image related to unsafe driving, using a learned model; and
   provide an estimated image to a user terminal.

4. An information processing method implemented by a computer, the information processing method comprising:
   acquiring a plurality of captured images of an outside of a vehicle;
   detecting, from the acquired plurality of captured images, a plurality of images related to unsafe driving using a learned model;

extracting, from the detected plurality of images related to unsafe driving, an image to be a candidate for relearning data of the learned model;

conducting relearning of the learned model using, as relearning data, an image that has been identified not as an image related to unsafe driving, among images that each have been extracted because a confidence thereof was equal to or greater than a threshold and a predetermined condition was satisfied;

wherein, when a confidence of a detected image related to unsafe driving is less than the threshold, or when the confidence of the detected image related to unsafe driving is equal to or greater than the threshold and the detected image related to unsafe driving satisfies the predetermined condition under which false detection is likely to occur, extracting the detected image related to unsafe driving.

\* \* \* \* \*